Patented July 31, 1951

2,562,384

UNITED STATES PATENT OFFICE 2,562,384

PREPARATION OF QUATERNARY AMMONIUM SALTS OF ACYLATED AMINOETHYL MORPHOLINES

Hans S. Mannheimer, New York, N. Y., assignor to John J. McCabe, Jr., and Hans S. Mannheimer, as joint venturers No Drawing. Application October 5, 1949, Serial No. 119,765

3 Claims. (Cl. 260—247.2)

This invention relates to novel compositions of matter and to methods for producing them as well as novel methods for employing them. More particularly this invention is directed to novel compositions finding utility in various fields and to methods for producing them. In one of its more specific aspects this invention is particularly directed to novel compositions which may be employed as germicides, fungicides, spore carrying bactericides, spermicides, antiseptics, algaecides, deodorants, wetting agents, detergents, emulgators, color fixers, foaming agents and as animalisers and softeners for cotton fibers and the like, and also as anti-oxidants and corrosion preventives for iron, "tin cans" and the metallic collapsible tube now on the market.

The compositions of the present invention are quaternary ammonium compositions and have outstandingly high wetting, foaming, foam stability and alkali stability characteristics and also exceptionally low toxicity while having a pleasant odor, if any, while being non-vesicant and palatable. The compositions of the present invention are superior in the aforementioned respects when compared with quaternary ammonium compositions, such as lauryl pyridinium chloride, lauryl dimethyl benzyl chloride, ethoxy dimethyl ammonium benzyl chloride, etc.

Moreover, aqueous solutions of morpholine soaps and other previously known morpholine derivatives have very low foaming and foam stability characteristics. It was startling to find that aqueous solutions of the compounds of the present invention have high foaming and foam stability characteristics, in view of their being morpholine quaternary ammonium derivatives.

These novel compostions are readily and easily produced on a commercial scale and according to this invention they may be produced at a relatively low cost due primarily to the fact that commercially available reactants of reasonably low cost may be used. These compositions produced in accordance with the invention are heat stable and not subject to chemical rearrangement under the influence of heat.

While various methods may be employed for the production of these compositions, I prefer first to react amino ethyl morpholine with an organic monocarboxylic acid under reduced pressure conditions to remove one mole of water and provide a condensate. The condensation is carried out in the temperature of 130–190° C. and under reduced pressure conditions of 10–400 mm. of mercury pressure. The acid number of the condensate produced is no greater than 2 and may be as low as 0. Then these compositions may be reacted with benzyl chloride under either aqueous or non-aqueous conditions to provide the compositions of the present invention.

In the production of condensate there may be employed any of the organic acids containing a single COOH group or any of the available anhydrides of said acids and by the term monocarboxylic organic acid as used herein, I mean to include both the acid and any of the anhydrides thereof which I regard as the equivalent of the acid. These acids may be: the aliphatic open chain saturated or unsaturated fatty acids as well as said fatty acids containing hydroxy or keto groups and/or other substitutes, such as aryl radicals, as for example, acids of the type of Twitchell fatty acids: cycloaliphatic radical carboxylic acids preferably containing no more than four condensed nuclei and examples of which are hexahydrobenzoic, resinic, and naphthenic acids; heterocyclic aliphatic carboxylic acids, such as the various pyridine carboxylic acids.

The carboxylic acids employed are those having at least eight carbon atoms and preferably those fatty acids of 8–18 carbon atoms. The acids which I employ may be derived from a number of different sources. Among some of them are the acid components chosen from oil or fats of animal, marine or vegetable origin and these include: the acids of cocoanut, palm kernel and palm oil which contain fatty acids having at least eleven carbon atoms and also from soy bean, linseed, olive, rapeseed, cottonseed, peanut and castor oil which contain large proportions of unsaturated hydroxy fatty acids and also the acids derived from tallow, fish and seal oils, whale or shark oils and the hydrogenated acids from these sources. Moreover, the synthetic high molecular weight fatty acids obtained by the oxidation of paraffin wax and similar high molecular weight hydrocarbons by means of gaseous oxidizing agents may be employed. In addition the acid may be one of the resinic acids such as abietic acid or the naphthenic acids and long chain fatty acids having an aromatic hydrocarbon radical connected directly with the aliphatic chain (Twitchell fatty acids) as are obtainable from oleic, ricinoleic, linoleic and similar unsaturated fatty acids. Instead of employing mixture of acids from oil, fats and resins, single acids may be used, for example; caproic, pimilic, heptylic, caprilic, sebacic, undicyclic, lauric, palmitic, stearic, behenic, arachic, cerotic, oleic, eruca, linoleic, linolenic, ricinoleic and hydroxystearic acids.

In carrying out the reaction to provide the condensate, there is placed in a reacting chamber a mixture of amino ethyl morpholine and the desired monocarboxylic acid, in the molecular proportions of 1.06 to 1, thus providing an excess of the amino ethyl morpholine. The mixture is maintained under slightly reduced pressure conditions (300–400 mm. of mercury pressure) in said reaction chamber and gradually heated over a 2–3 hour period until a temperature of approximately 140-155° C. and preferably 150° C. has been attained. Over this period the distillate is collected and at the end of said period substantially no further distillate is produced. Then the pressure in the chamber is further and gradually reduced to 10 to 20 millimeters of mercury pressure and the temperature is gradually increased to about 160-190° C. and preferably 175° C. over a period of three to four hours, and in this step also the distillate is collected. The distillates are combined and are found to contain water of reaction and the excess amino ethyl morpholine, with the quantity of water being approximately 1 mole. The resultant condensate is light colored and has an acid number in the range of 0-2. Then to said condensate is added a quantity of benzyl chloride in the molecular proportion of 1 to 1.05 (5% excess). The benzyl chloride is gradually added thereto over a period of approximately thirty minutes, while the temperature of the mass is maintained above about 94° C. and generally in the range of 96°-98° C. However, I found that soon after the addition of the benzyl chloride the temperature of the mass increased to about 106°-107° C. and then gradually dropped to 98° C. Heating is controlled to maintain said mass at a temperature of 96°-98° C. for a period of about seven hours after said drop in temperature to provide a finished reaction mass.

If desired, the benzyl chloride may be added by first dispersing the condensate in an equal amount of distilled water by weight, and the benzyl chloride is added as before. When this procedure is employed, the finished product is somewhat lighter in color, and the reaction time is reduced from 7 to 4-5 hours.

The following examples are given merely to illustrate the invention, and are not to be regarded in a limiting sense.

*Example 1*

200 parts lauric fatty acid (1 mole)

138 parts amino ethyl morpholine (1 mole and 6% excess) are mixed together in a reaction vessel. Said mass is maintained under slightly reduced pressure conditions (300-400 mm. of mercury pressure) and gradually heated to a temperature of about 150° C. over a period of two to three hours and a distillate is continuously withdrawn and collected during this period. At that time no further distillate appears. Then the pressure in said chamber is gradually further reduced and maintained at 15 to 20 millimeters of mercury pressure while the temperature is gradually raised to 170°-175° C. over a period of about three to four hours, and in this period the distillate is again collected. The distillates are combined and are found to contain the excess amino ethyl morpholine and approximately one mole proportion of water. The organic condensate has an acid number of less than one.

Then 318 parts of said condensate are placed in a jacketed reaction vessel and heated to a temperature of 96°-98° C. While said condensate is maintained at said temperature, 134 parts of benzyl chloride (5% excess of 1 mole) are gradually introduced thereto over a period of about 30 minutes. Shortly after the addition the temperature of the mass spontaneously rises to 106°-107° C. Then the temperature of the mass decreases to about 98° C. After all the benzyl chloride has been added and the drop in temperature attained, the temperature of said mass is maintained at 96°-98° C. over a period of about 5-7 hours; then the mass is allowed to cool, and is the finished product which may later be purified.

One part by weight of said "finished" reaction mass in 100 cc. of water provides a clear solution which remains clear on prolonged standing and upon agitation surprisingly produces voluminous and highly stable foam.

If desired, the reaction mass may be purified by: first, in an air stream distilling off any excess benzyl chloride contained in said mass. Then 100 parts by weight of said product may be added to 100 to 300 parts of water and this solution containing a small proportion of solid matter is filtered to remove the precipitate which amounts to 1 to 3 parts by weight and apparently is a benzyl chloride polymerization product. Caustic soda may then be added to said solution so that the pH thereof is adjusted to about eight. Then if desired, it may be bleached to a light amber color by adding to said filtrate 1% of a 30% aqueous solution of hydrogen peroxide. The peroxide addition is preferably carried out in five equal portions while maintaining the temperature of the mass at 70° to 85° C. over a period of about two hours. This purified product, when tested according to the test method of Federal Drug Administration, Circular 198 U. S. Department of Agriculture, against a 24 hour culture of *Eberthalla thyphosa* (Hopkins strain) and an incubation period of 48 hours at 37° C., showed a phenol coefficient of 275 on a 100% product basis.

Further the minimum lethal dose administered interperitoneally to mice was .04 gram per kilograms of body weight. In an attempt to establish the minimum lethal dose by ingestion, the product was fed to albino rats in their daily water supply in equal proportions over a period of seven days in various concentrations. Although a maximum total of 5.4 grams was fed to each rat, none of the test animals died.

The product was further tested for skin irritation by injection underneath the skin of adult female rabbits. The skin irritation indicated was no greater than that obtained by employing a good toilet soap solution of the same concentration.

An aqueous solution containing 20% of the product was diluted to the following concentrations and the surface tension of these solutions measured in Dynes percentimeter.

| Per cent of 20% Solution | Surface Tension |
| --- | --- |
| .5 | 30.0 |
| .25 | 29.8 |
| .125 | 29.6 |
| .062 | 31.2 |
| .031 | 33. |
| .015 | 38.8 |
| .007 | 42.2 |

An aqueous solution containing 30% of the product was tested according to the Draves-Clarkson test for wetting qualities. In this test a five gram cotton skein sank in 25 seconds in a solution of a .2% of said 30% dilution at a temperature of 50° C.

The product was tested empirically for foaming qualities and foam stability. Tests showed that the product was comparable in both characteristics to high grade sulphonate synthetic detergents.

The product was further tested as a deodorant fungicide, spermicide and on spore carrying bacteria and showed high efficiency.

The product was also found to animalize cotton, thus permitting the dyeing of the so treated cotton with wool dyestuffs, thus eliminating the necessity of cross-dyeing in cotton-wool mixtures. For this purpose a .05–.075% aqueous solution of said product in a ten minute pretreatment of the cotton proved adequate for that purpose.

The product was further tested for improvement of water fastness of cotton dyes. Aftertreatment for ten minutes, following the dyeing or printing, with a solution containing .05–.075% of the product proved efficient.

The product was still further tested as an emulsifying agent for gloss paints and enamels. It was found that an addition of 1–2% of the product to such paints and enamels permitted the addition of 50% water based on the volume of paint or enamel without any appreciable loss of gloss, coverage or durability.

The product was further tested and found to have high detergency properties in the absence of anionic active materials. However, in the presence of alkalies the detergency properties of said compound were excellent, even in the presence of the anionic materials.

The product was found to be soluble in acid solutions as well as in alkaline solutions whose pH may be as high as twelve. The product was also soluble in the common organic solvents, such as acetone, kerosene, alcohol, etc.

The product was tested as an anti-oxidant and as a corrosion preventative by preparing a 25% solution of the product in water and this solution was placed in a common metal container of the so-called "tin can" type. At the same time, the same volume of water was placed in a corresponding "tin can." The effect was observed after 72 hours of room temperature and it was found that the tin can containing the plain water was badly corroded and showed considerable amounts of rust, while the can containing said solution of said product showed no rusting whatever.

*Example 2*

The same procedure as that set forth in Example 1 was employed except that 284 parts of stearic acid (1 mole) was used instead of the lauric acid. Tests of the finished product showed that while it possessed the properties of the composition of Example 1, they were present in a more limited degree, but it was found to be superior as a softener for cotton.

*Example 3*

The same procedure as that set forth in Example 1 was employed, except that 172 parts of capric acid (1 mole) was used instead of the lauric acid. The finished product so produced is particularly suitable as a constituent of shampoo or hand soap, because of its high germicidal efficiency and foam characteristics.

*Example 4*

The same procedure as that set forth in Example 1 was employed, except that 228 parts of myristic acid (1 mole) was used instead of the lauric acid and the benzyl chloride was reacted under aqueous conditions. Approximately 348 parts of the myristic acid-amino ethyl morpholine condensate is dispersed in 348 parts of water above about 94° C. and generally in the range of 96°–98° C.; then the benzyl chloride is added while the temperature of the mass increases to approximately 102° C. and then gradually drops to about 98° C. Heating is controlled to retain the mass at 96°–98° C. for a period of about four hours under reflux conditions after said drop in temperature to provide an aqueous solution of a finished reaction mass. The reaction product may be purified in the manner set forth in Example 1. The resultant product was somewhat better in germicidal efficiency than the lauric compound, but showed less surface tension reduction and also somewhat less foaming capacity.

The specific Examples 1-4 have been given merely by way of illustrating a particular method for producing the lauric and stearic derivatives. The various other derivatives may be produced by employing the same procedure as that set forth in Example 1 and substituting 1 mole proportion of the desired monocarboxylic acid for the lauric acid of said example.

Since certain changes may be made in the afore-described process for providing the novel compounds of the present invention, it is intended that all matter in the afore-description shall be interpreted as illustrative and not in a limiting sense.

I claim:

1. The method comprising, at elevated temperature in the range of 130°–190° C. and under reduced pressure conditions of 10–400 millimeters of mercury pressure, condensing a mixture of approximately one mole of amino ethyl morpholine with approximately one mole of monocarboxylic fatty acid of 8–18 carbon atoms until approximately one mole of water has been formed and removed, then reacting said organic condensate with benzyl chloride.

2. The method comprising, at elevated temperature in the range of 130°–190° C. and under reduced pressure conditions of 10–400 millimeters of mercury pressure, condensing a mixture of approximately one mole of amino ethyl morpholine with approximately one mole of monocarboxylic fatty acid of 8–18 carbon atoms until approximately one mole of water has been formed and removed, then reacting said organic condensate with benzyl chloride under non-aqueous conditions.

3. The method comprising, at elevated temperature in the range of 130°–190° C. and under reduced pressure conditions of 10–400 millimeters of mercury pressure, condensing a mixture of approximately one mole of amino ethyl morpholine with approximately one mole of monocarboxylic fatty acid of 8–18 carbon atoms until approximately one mole of water has been formed and removed, then dispersing said condensate in water and subsequently adding benzyl chloride thereto and reacting said benzyl chloride with said condensate in said dispersed condition.

HANS S. MANNHEIMER.

REFERENCES CITED

The following references are of record in the file of this patent:

UNITED STATES PATENTS

| Number | Name | Date |
|---|---|---|
| 2,246,264 | Pinkernell | June 17, 1941 |
| 2,268,395 | Henke et al. | Dec. 30, 1941 |
| 2,282,702 | Bock | May 12, 1942 |
| 2,429,679 | Georges | Oct. 28, 1947 |

FOREIGN PATENTS

| Number | Country | Date |
|---|---|---|
| 364,104 | Great Britain | Dec. 28, 1931 |
| 518,989 | Great Britain | Mar. 13, 1940 |

OTHER REFERENCES

Cheney et al., Jour. American Chemical Society, vol. 64 (1942), pages 970–973.